United States Patent Office 3,183,057
Patented May 11, 1965

3,183,057
PRODUCTS AND PROCEDURES FOR EFFECTING TREATMENT WITH CHLORINOUS GAS

Henry C. Marks, Glen Ridge, and Robert R. Joiner, Belleville, N.J., and George U. Glasgow, Bronx, N.Y., assignors to Wallace & Tiernan Inc., a corporation of Delaware
No Drawing. Filed Nov. 3, 1958, Ser. No. 771,174
13 Claims. (Cl. 21—58)

This invention relates to products and procedures for generating chlorinous gases, and in a particular sense relates to the protective treatment of natural, grown products during storage or shipment in packing containers and the like. In a more specific aspect, the invention is concerned with products and procedures for inhibiting decay of citrus fruit or similar produce as contained in cartons, boxes or other shipping or storage containers.

A persistent problem in the distribution of fruit and like products, including citrus fruit, peaches, tomatoes, canteloupes and many other articles, has been decay arising in the course of storage or shipment, as by mold or other microbial attack or growth. The problem appears particularly critical where the fruit, such as oranges, lemons, grapefruit or the like, is packed in closed cartons and may have to remain so packed for a considerable time.

One method by which it has been sought to preserve citrus fruit in transit is to use diphenyl, for example either as an application to cardboard separators in the fruit carton or as an impregnation in a tissue wrapping for the fruit. This substance has sufficient vapor pressure to maintain a preservative concentration of vapor within the carton, and it is very effective, but it has a highly unpleasant and lingering odor. It appears, too, that some residue of the chemical tends to remain in the juice and pulp of the fruit. For these reasons, there has been serious objections to the use of diphenyl for preventing decay of the boxed produce.

An alternative proposal for protecting the fruit is to dip it in solutions containing fungicides such as ortho phenyl phenol, whereby a residue is left on the produce that exerts some inhibitory effect. However, it has been found that such treatment is not in general as reliable as the use of a material having a significant vapor pressure, i.e. a material which provides a vapor that can penetrate and can cover the susceptible surfaces of the packed fruit more completely.

A procedure which has been highly effective in protecting fruit that is stored in bulk or open containers in closed storage rooms or the like has involved the use of nitrogen trichloride. This gas is generated and allowed to permeate the storage area, where a very small concentration of it in the atmosphere is very effective for the desired results. Unfortunately, nitrogen trichloride is unstable and it has therefore only been used by generating it at the locality of treatment, with appropriate apparatus of considerable physical size. The gas is produced and delivered with substantial dilution of air. Its use has not been adapted for treatment otherwise than in storage rooms where it can be more or less continuously supplied, since the mere introduction of a single quantity of it into a carton or other container will not insure its remaining for any time of significance relative to the requirement of having preservative action over a period of days or longer. Furthermore its use in large storage areas has been limited because of its tendency to corrode such electrical and mechanical equipment as may be present in those areas. In any event, there has heretofore been no way of effectively using it for overcoming the problem of decay in fruit that is packed in cartons or the like, over the time that such cartons may be in transit or in storage at localities of ultimate distribution, nor as explained above, has any other procedure been found that is both economical and wholly satisfactory, for protecting fruit under these conditons.

For the solution of this and kindred problems, the present invention involves the provision of a novel composition of ingredients (as defined below) which can be introduced into a closed container such as a carton and which will undergo a continuing reaction, particularly by virtue of moisture vapor evolved from the fruit, so as to yield a continuous production of nitrogen trichloride gas. In a more specific and particularly advantageous form, the invention involves a solid, e.g. powdered composition, which in its normal dry state can be kept for relatively long periods wtihout change, but which will provide the stated reaction in the moisture-laden air of the citrus-containing carton, to release nitrogen trichloride at a rate sufficient to impede or prevent the fungus decay of the fruit. An especially useful form of the invention involves a package of the powdered mixture consisting of a porous paper envelope containing a suitable quantity of it. Such envelope is simply inserted in the citrus carton or the like before the latter is closed for shipment. Over the course of time, the moisture permeating the envelope and reaching the reagents causes liberation of nitrogen trichloride, which even in relatively minute concentration is effective to control decay, e.g. concentration as low as fractions of a milligram per cubic foot of air.

Although the compositons and procedure of the invention as designed to afford liberation of gas which consists wholly or chiefly of nitrogen trichloride are of unusually superior value, the present improvements, in a more general sense, embrace corresponding compositions, products and procedures for continuing generation of chlorinous gas, i.e. gas which may wholly or substantially consist of either nitrogen trichloride or other gaseous chloramines ($NHCl_2$ and $NH_2Cl$) or chlorine or various mixtures of the same. For instance, there may be some situations or requirements where chlorine or a chlorinous gas consisting largely of chlorine may be preferred, although in the case of citrus fruit experience indicates that nitrogen trichloride is of much greater value.

By virtue of the products and procedures of the invention, a preservative gas is effectively maintained in a carton of fruit or the like, over relatively long periods of time. No complicated generating equipment is needed; at the same time, because the gas is liberated in relatively small quantities, its instability presents no problem. Furthermore, since it represents only the merest trace in the surrounding atmosphere as it may ultimately escape through the walls or other parts of the container, there is no difficulty from the standpoint of corrosion in mechanical, electrical or other equipment that may be present in the vicinity of the cartons.

Although the new procedures and compositions or articles herein described are deemed to represent an invention of special significance in the preservation of citrus fruit and other produce during shipment or storage in cartons or the like, it will be appreciated that such products and processes are applicable to other purposes, e.g. wherever a confined space, whether it is a carton, a car or other mobile or stationary chamber, must be protected or treated by a gas of the stated character and where moist air will be available to bring about the reaction, over a continuing period of time.

The composition of the invention comprises essentially two ingredients or two groups of ingredients. The first or primary ingredient is a chlorine compound in which the chlorine is active or, in other words, in a positive valence state. Such suitable substances are various N- chloro compounds, hypochlorites and chlorates. The second ingredient or group of ingredients must comprise or include a source of acid or, in some cases, alkali. Unusual effectiveness is obtained with an acid reagent; indeed a special feature of the invention resides in the provision of essentially dry powdered compositions comprising a mixture of an active chlorine compound and an acidic reagent, which mutually react, in the presence of moisture, to release chlorinous gas. In the case of N-chloro compounds it has been found that gas of some utility can be evolved with mixtures employing an alkali, e.g. an alkaline salt, as the principal coacting reagent, but substances such as hypochlorites and chlorates require acid rather than alkali, and as stated, in all cases the use of the acid reagent is greatly preferred, and indeed has represented marked superiority in test results.

The reagent material, considered as a group of ingredients for effecting the release of the desired chlorinous gas by reaction involving the active chlorine compound, must include an ammonium salt or other source of ammonium ions, to the extent that nitrogen trichloride is to be evolved. A further ingredient of importance in many cases is a substance that supplies chloride ions. For example, where it is desired that the produced gas be essentially only nitrogen trichloride (rather than a mixture of chloramines), chloride ions should be present, at least in small amount. In all cases where the chlorinous gas is to be produced from a chlorate, chloride ions must likewise be present, in amount as demanded by the stoichiometry of the reaction. In cases such as noted above, it also appears that the rate of evolution of the product gas can be regulated by the amount of chloride present. For truly efficient realization of the function of the chloride, there should be at least enough of it present to provide the amount theoretically needed to react with all of the available chlorine, i.e. as present in the N-chloro compound or equivalent source.

It may be noted that whereas the sources of acid, of ammonium and of chloride, for instance as in a composition designed to evolve nitrogen trichloride, have been described as in effect three ingredients, two or more of them may be constituted, in practice, as a single compound; for instance, ammonium chloride has been found highly effective as the acid reagent for generation of nitrogen trichloride from various active chlorine compounds, such ammonium chloride serving then also as the sources of ammonia and of chloride ions.

Presently preferred examples of active chlorine compounds appropriate as the primary reactant in the compositions and procedures of the invention, are the various chloromelamines such as trichloromelamine, pentachloromelamine and hexachloromelamine, and substances such as dichloramine T, dichloro dimethyl hydantoin and trichloroisocyanuric acid. More generally any N-chloro compound whatever may be used, providing it is stable, i.e. in exhibiting substantial stability over a period of months, and providing it is solid under normal conditions, e.g. at ordinary temperatures, so that it can be employed in a dry powder or equivalent state. Further instances of N-chloro compounds meeting these requirements are: dichloroisocyanuric acid, monochloramine T, dichloramine B, succinchlorimide, N,N'-dichloroazodicarbonamidine, p-sulfone dichloramido benzoic acid, monochloro urea, N-chloro biuret, and N-chloro acetyl urea.

Additional examples of chlorine compounds where the chlorine is in a positive valence state, suitable for the invention, are calcium hypochlorite and sodium chlorate. Other hypochlorites and chlorates as of alkali and alkaline earth metals, that have appropriate characteristics of stability and of availability, are suitable, additional examples being lithium hypochlorite, tertiary butyl hypochlorite, barium chlorate, potassium chlorate, and calcium chlorate.

The basic requirement of the acidic ingredient is simply that it provide a source of acid, i.e. that it be an acid reagent. Substances such as salts having significant acid reaction are appropriate, there being a number of suitable compounds known for such characteristics, for instance ammonium chloride, ammonium sulfate, sodium bisulfate, aluminum chloride and aluminum sulfate. Other acid reagents that have been employed are compounds such as tartaric acid and sulfamic acid. Although reagents available in dry solid form are chiefly contemplated, it is possible that the source of acid may be partly or wholly constituted by materials such as essentially non-volatile mineral acids as exemplified by sulfuric acid and phosphoric acid, it being understood that an acid of this character can be employed where sufficient dry, solid material is otherwise present, as in the nature of a carrier or diluent, which can be impregnated with the normally liquid acid to afford a non-fluid composition.

Very preferably, when the composition is designed to generate nitrogen trichloride, the acid ingredient should be of relatively moderate strength as distinguished from strongly acidic substances, such as sulfuric acid and sodium bisulfate. Thus for release of nitrogen trichloride, special advantage resides, e.g. in achieving the desired prolonged effect, with ammonium chloride, ammonium sulfate and other materials having similar acid strengths, other examples being aluminum sulfate, tartaric acid, citric acid, sodium dihydrogen phosphate, acetic acid, boric acid, and aluminum chloride. Strong acids, e.g. sodium bisulfate, are especially suitable and indeed may be preferablle, for generation of chlorine. Other strong acids are such substances as sulfuric acid, phosphoric acid, phosphoric anhydride, and hydrochloric acid.

Where an alkaline composition is to be used, as in some cases for generation of chlorinous gas from an N-chloro compound, a stable, solid alkali reagent is employed instead of the acid. Examples are alkaline salts such as sodium carbonate, ammonium carbonate, tetrasodium pyrophosphate, borax, disodium phosphate and sodium tripolyphosphate.

The ammonium salt or equivalent source of ammonium ions, as needed for generation of nitrogen trichloride, is most conveniently provided by an ammonium compound such as ammonium chloride or ammonium sulfate. As stated, these compounds may, but need not necessarily, constitute a source of other ions or of reagent effect in the composition. Other suitable ammonium compounds are, for example, ammonium alum, ammonium dihydrogen phosphate, diammonium phosphate, and ammonium carbonate. Substances yielding ammonium ions by simple hydrolysis are also useful, e.g. urea and sulfamic acid.

The chloride, where used, may take the form of ammonium chloride, sodium chloride or indeed any appropriate chloride which is a dry solid and is appropriately soluble in water. Further instances are potassium chloride, calcium chloride, magnesium chloride, and aluminum chloride.

In some circumstances the compositions for release of chlorinous gas may benefit by the inclusion as optional ingredients, of substances providing in effect a regulation of the quantity of moisture that will become associated with the reacting ingredients as necessary to provide the desired evolution of gas. For instance, in some cases the atmospheric moisture, e.g. expected to be released by the fruit, may be relatively slight and in that event a suitable hygroscopic agent can be included to attract the moisture to the composition in larger quantities than might otherwise occur. Examples of hygroscopic agents are calcium chloride, aluminum sulfate and various types of alum.

Alternatively, the expected conditions in the carton of produce may be such that excessive moisture will be present, actually wetting the powder and even causing loss of ingredients from the mixture by leakage or dispersal of solution. When such conditions prevail, as may readily be ascertained by test, the composition can advantageously include a dehydrating agent, such as silica gel, dehy drated alumina and other inert moisture-absorbing material. In some cases or in addition, to avoid undue wetting of the mixture it has been found convenient to disperse the powder in a mass or body of cotton fibers such as non-absorbent cotton, which is then encased in the paper envelope or other receptacle.

It may also be desirable to include some entirely inert substance, e.g. as simple diluent or carrier, especially where purposes of handling, of weighing out suitable quantities, of avoidance of inflammability, and the like, seem to require such material. As examples of this optional ingredient, appropriate substances are anhydrous sodium sulfate, diatomaceous earth, calcium sulfate, calcium carbonate, silicon dioxide, clay, magnesium sulfate, magnesium carbonate, and calcium silicate.

As explained above, specially effective results are achieved by providing a mixture of the ingredients in powdered form and incorporating such mixture in a porous container, e.g. an envelope of ordinary paper, porous resin, fiberglass, glass wool or cotton, in appropriate amount for reaction over a desired number of days or other interval. This porous envelope containing the composition, which may constitute a unitary article of manufacture, is then inserted in the carton of citrus fruit, e.g. oranges or lemons, at the time of packing. It can simply be put in the bottom of the carton or placed on top of the oranges before the carton is closed, or disposed at some central position. Thereafter, as moisture from the fruit permeates the envelope, the desired reaction occurs, continuously releasing the chlorinous gas, e.g. nitrogen trichloride, which diffuses through the envelope and permeates the entire interior of the box, reaching essentially all surfaces of the fruit. Quite advantageously, in making up the composition, the ingredients are very completely dried, and the powder is then mixed and packaged in the described envelopes. The filled and sealed envelopes can then be kept for relatively long periods of time, without deterioration of the contents, assuming that they are stored in a sealed container or in an appropriately dry atmosphere.

Alternatively, if special effort in completely drying the ingredients is not feasible, the active chlorine compound can be kept separately from the other ingredients and the mixture can be made up only at the time it is to be inserted in the carton or other space to be treated. Under such circumstances, the ingredients can be thoroughly mixed, measured out into porous paper envelopes and the latter promptly deposited in a series of cartons being packed with fruit. Other types of bags or containers or indeed other mechanical retaining devices may be employed to hold the desired, relatively small quantity of the mixture at a suitable locality in the carton, a simple requirement of all such means being that the enclosed or supported composition be accessible to moist air and be correspondingly permeable for delivery of the evolved chlorinous gas.

Other modes of use of the composition, e.g. in the described procedure, may involve impregnating the mixture of ingredients in or otherwise applying it to various plastic, paper or other supporting sheets or structures. For example, after the ingredients have been thoroughly dried, they may be carefully mixed and then suspended in a non-aqueous inert, volatile medium, for the desired impregnation of a sheet or other support which can then be inserted in a carton. Alternatively, it is possible to incorporate the active chlorine compound, as by impregnation, into a paper, fabric, plastic sheet or the like, while similarly incorporating the other ingredient or group of ingredients in a like article. The two articles can then be brought together, as by simple physical contact of their coextensive surfaces, at the time of introduction into the fruit carton or the like. Where undue escape of the gas is otherwise prevented, the mixture of ingredients may be applied or impregnated in interior structure of the carton, for example as on inner flaps or other areas.

In special instances, some useful action has been achieved by inserting into the enclosed space two physically separated mixtures, one of which liberates chlorine and the other ammonia as the result of the presence of moisture in the air. For instance, one such mixture may consist of an N-chloro compound, hypochlorite or the like with an acidic reagent that does not contain ammonia, while the other mixture or material may be an ammonia releasing composition such as ammonium carbonate. However, the use of separate compositions in this manner is not usually as desirable as a single, mixed composition, and in practice may require special care or attention, at least to be sure that both compositions are inserted in each carton or the like.

In general, the mutual proportions of ingredients should be such as will effectively provide the desired reaction, and the amount used, e.g. in a paper envelope or the like, should be sufficient to yield a useful quantity of the gas over the required interval of time. The last-mentioned amount may therefore vary with the expected time of shipment and storage, and may be readily determined by appropriate test. Reverting to the mutual amounts of the reacting and other substances present, it will be seen that the acid, or alkali, should be adequate in quantity to effectuate release of as much of the active chlorine as possible, i.e. to avoid uneconomical waste of the chlorine compound.

For generation of nitrogen trichloride, the ammonium salt should ordinarily be sufficient to react with essentially all of the active chlorine, i.e. thus in a quantity providing at least one-third of a mol of ammonia per atom of active chlorine (or one-third mol of ammonia per mol of available chlorine). As will be seen, optimum amounts of the acid and other secondary reagents are conveniently related to the quantity of chlorine that can be released from the active chlorine compound. Thus with respect to the amount of active chlorine present in such compound, usable quantities of acid, in the production of nitrogen trichloride, can vary over a relatively broad range, for example such as to produce a pH in the reacting mixture of 1.5 to 5.5. Preferably the amount of acid is chosen to afford a pH of 3 to 4. Where a chloride is included in the mixture (to produce nitrogen trichloride) a preferred range is from ½ mol to 2 moles of chloride per mol of available chlorine.

Dehydrating or hygroscopic agents are employed, if necessary, in amounts requisite for their intended purpose, again as may be readily ascertained by simple test. Where a diluent is used, convenient amounts would range up to and in some cases well beyond 90%, and would ordinarily lie within 25% to 75% or more of the total composition (including the chlorine compound) by weight.

The following are examples of articles, compositions and procedures embracing the invention, which will serve further to illustrate a number of variations and alternatives in amounts, proportions, specific ingredients and mode of use. Unless otherwise stated, all statements of parts, percentages and the like are given by weight.

*Example 1*

A first ingredient, called part A, consisted of trichloromelamine 30% and anhydrous sodium sulfate 70%, in powder form, intimately mixed, these compounds having first been highly desiccated. A second ingredient, called part B, consisted of ammonium chloride in dry powder form ($NH_4Cl$). Then 0.37 gram of part A and 0.16 gram of part B were intimately mixed and inserted in a porous pure cellulose paper envelope having dimensions about 4½ by 4½ inches. It was found that envelopes filled with this mixture could be stored for at least several weeks, in reasonably dry air or in a closed container, without losing effectiveness. When an envelope so filled was placed in a stream of moist air for a period of 7 days it was found that 56 milligrams of available chlorine were liberated, as shown by absorption and titration. It will be understood that in the quantitative references to "available chlorine" here and in other descriptions of produced gases and of N-chloro compounds or the like, such values are expressed with the meaning commonly employed in the art. That is to say, where the chlorine is in elemental gaseous form, the term "available chlorine" refers to the actual quantity of chlorine in molecular form $(Cl_2)$; where the chlorine is combined as in the N-chloro compounds or in hypochlorites or in nitrogen trichloride or other gaseous chloramine, the "available chlorine" means twice the quantity of atomic chlorine present.

In the above instance, the indicated release of available chlorine represented a liberation rate of 1.4 mg. of available chlorine per hour. Chemically, the gas revealed a nitrogen to available chlorine ratio (conveniently expressed as $N:Cl_2$) of 1:15. Since such ratio for nitrogen trichloride $(NCl_3)$ is 1:15.2 it is apparent that the gas was essentially entirely nitrogen trichloride.

*Example 2*

Three different mixtures of trichloromelamine, as shown in the following table, were tested for effectiveness in preventing decay of lemons. The lemons were inoculated with fungus spores by a standard procedure, placed in cartons and then an envelope of the powdered mixture containing in each case sufficient to give 2.44 grams of available chlorine was placed in each carton. The cartons were then closed and kept for 13 days at 50° F. and thereafter for 4 days at 58° F. They were then opened and the number of decayed lemons counted. The percent decay for each composition is given in the following table. A carton of untreated and similarly inoculated lemons used as a control showed 70% of the lemons decayed. The table shows the percentage composition of the mixture in each of three tests, as well as the percent of lemons decayed in each case:

|  | 1 | 2 | 3 |
|---|---|---|---|
| Trichloromelamine, percent | 17.8 | 19.2 | 20.5 |
| $NH_4Cl$, percent | 11.7 | 44.0 | 79.5 |
| $(NH_4)_2SO_4$, percent | 70.5 | 36.8 | |
| Percent decay | 13 | 16.1 | 8.1 |

*Example 3*

In another decay control experiment the following composition was used:

| | Percent |
|---|---|
| Hexachloromelamine | 16.6 |
| $Al_2(SO_4)_3 7H_2O$ | 52.7 |
| $NH_4Cl$ | 30.7 |

This preparation was made by melting hydrated aluminum sulfate with ammonium chloride, cooling and powdering and then mixing with the chloromelamine. Again, the composition was placed in a carton of inoculated lemons in sufficient quantity to give 3.26 grams of available chlorine per carton. After 16 days at 58° F. the carton containing the composition showed 36% decay while one that was untreated showed 84% decay.

*Example 4*

In this test of use of the invention for control of decay in lemons in a carton, the following ingredients were used to make up the gas-releasing composition:

Part (A) 1.73 g. of hexachloromelamine.
Part (B) 16 g. of the following salt mixture:

| | Percent |
|---|---|
| $(NH_4)_2SO_4$ | 26.6 |
| $AlCl_3 \cdot 6H_2O$ | 16.3 |
| $Al_2(SO_4)_3 \cdot 18H_2O$ | 44.0 |
| $H_2O$ | 13.1 |

The salt mixture and the hexachloromelamine were ground together just before use and distributed in three flat dishes which were placed on top of the fruit in the carton. Again using inoculated lemons, after 18 days at 58° F. the treated carton showed 4% decay while the untreated control showed 42% decay.

*Example 5*

In a similar test on fungus-inoculated oranges, using the following composition.

| Part (A): | Percent |
|---|---|
| Hexachloromelamine | 40.7 |
| $Na_2SO_4$ anhyd. | 59.3 |
| Part (B): | |
| $(NH_4)_2SO_4$ | 16.3 |
| $Na_2SO_4$ anhyd. | 83.7 | in the amount of 4 g. of each part per carton, mixed together and then divided into two parts respectively placed in two open dishes, the fruit decayed to the extent of 58% in 9 days at room temperature while the control showed 90% decay under the same conditions.

*Example 6*

In a further test, using the following composition.

| Part (A) | Percent |
|---|---|
| Hexachloromelamine | 40.7 |
| Tetra-sodium pyrophosphate anhyd. | 59.3 |
| Part (B) | |
| $(NH_4)_2SO_4$ | 16.3 |
| $Na_2SO_4$ anhyd. | 83.7 | in the amount of 16 g. of each part per carton (mixed and divided, as before) in two open dishes, the oranges decayed to the extent of 30% in 9 days at room temperature while the control showed 90% decay under the same conditions.

*Example 7*

In this and in the following Examples 8 to 12, inclusive, tests were made of various compositions, to determine the character and amount of the chlorinous gas released, the chemical and analytical determinations being made, as in other instances herein, by standard procedures. In this particular example, the composition employed was as follows:

| | Percent |
|---|---|
| Calcium hypochlorite | 6.3 |
| $(NH_4)_2SO_4$ | 1.6 |
| $H_2SO_4$ | 1.8 |
| Micro-Cel 1A | 90.3 |

Micro-Cel 1A is understood to be a synthetic calcium silicate, of fine particle size, having a high absorptive capacity. A sufficient quantity of the above mixture to give a theoretical 88 mg. of available chlorine was found to release 44 mg. of available chlorine over a period of 7 hours in moist air.

*Example 8*

| Composition: | Percent |
|---|---|
| Dichloramine T | 16.6 |
| NaCl | 27.2 |
| $NaHSO_4$ | 54.3 |
| $(NH_4)_2SO_4$ | 1.9 |

In this case the ingredients were mixed just before using. A sufficient quantity to give a theoretical 50 mg of available chlorine was found to give up 91% of the theoretical in 6 days in the presence of moist air. The $N:Cl_2$ ratio was found to be 1:175 which means that there was approximately 10 times as much of the available chlorine in the form of free chlorine as nitrogen trichloride.

*Example 9*

| Composition: | Percent |
|---|---|
| Dichloro dimethyl hydantoin | 14.3 |
| NaCl | 27.3 |
| $NaHSO_4$ | 55.2 |
| $(NH_4)_2SO_4$ | 1.5 |

When this composition was treated as in Example 8 78% of the theoretical chlorine was liberated with similar $N:Cl_2$ ratio.

Example 10

Composition: Percent
- Trichloro isocyanuric acid _____ 10.7
- NaCl _____ 25.0
- NaHSO$_4$ _____ 62.4
- (NH$_4$)$_2$SO$_4$ _____ 1.9

When this composition was treated as in Example 8, all of the chlorine was liberated and the gas contained a N:Cl$_2$ ratio of 1:120 which means that 7 times as much available chlorine was present as chlorine, as in the form of nitrogen trichloride.

Example 11

Composition: Percent
- NaClO$_3$ _____ 4.9
- NaCl _____ 31.0
- NaHSO$_4$ _____ 62.2
- (NH$_4$)$_2$SO$_4$ _____ 1.9

510 mg. of this mixture, which should theoretically produce 50 mg. of chlorine, when treated as in Example 8, gave 21 mg. of chlorine with a similar N:Cl$_2$ ratio.

Example 12

Composition: Percent
- Trichloro isocyanuric acid _____ 25
- NaCl _____ 50
- NaHSO$_4$ _____ 25

A sufficient quantity of this composition to give a theoretical 88.5 mg. of available chlorine was mixed together just before using and subjected to moist air for 3 days. 93% of its available chlorine was liberated.

Example 13

Composition: Percent
- Trichloromelamine _____ 5.0
- H$_2$SO$_4$ _____ 5.0
- (NH$_4$)$_2$SO$_4$ _____ 5.0
- Diatomaceous earth _____ 85.0

2 grams of this mixture should theoretically produce 92 mg. of available chlorine (Cl$_2$). When mixed and tested as in Example 8, it was found that 53% of the theoretical product had been evolved by the end of 13 days.

Example 14

Composition: Percent
- Hexachloromelamine _____ 9.8
- (NH$_4$)$_2$SO$_4$ _____ 24.0
- AlCl$_3$·6H$_2$O _____ 14.7
- Al$_2$(SO$_4$)$_3$·18H$_2$O _____ 39.7
- H$_2$O _____ 11.8

0.40 gram of this mixture should yield 50 mg. of available Cl$_2$. Again testing as in Examples 8, it was found that after 22 hours 78% of the theoretical had been evolved, with a N:Cl$_2$ ratio of 1:15, indicating the gas to be mostly NCl$_3$.

It will be understood that in the above instances (Examples 2 to 6) of actual tests with citrus fruit, the fruit, e.g. in the order of 200 lemons or 50 oranges per carton, had all been fully infected with a mixed culture of fungus organisms (specifically, *Penicillium italicum* and *Penicillium digitatum*), so as to make certain of the presence of serious decay-producing conditions. Hence the circumstances of these tests were particularly severe, thus indicating the utility of the invention under essentially all conditions where decay may occur, whether severe or otherwise. As will be noted, a number of tests, such as Examples 1 to 4 inclusive, involved compositions such that the produced gas was mainly or essentially entirely nitrogen trichloride. Examples 5 and 6 produced mainly mixed chloramines. In Examples 7 to 11 inclusive, the produced gas was a mixture, but preponderantly chlorine, while in Example 12 the gas was entirely chlorine, with no nitrogen trichloride. In Example 13 the gas was mainly mixed chloramines and in Example 14 mostly nitrogen trichloride.

Example 15

The following mixtures of solid, finely divided ingredients were prepared.

Composition I: Percent
- Trichlorocyanuric acid _____ 50
- Sulfamic acid _____ 50

Composition II:
- Pentachloromelamine _____ 50
- Sulfamic acid _____ 50

Samples of these compositions were stored in vented bottles (the contents having access to the ambient air of ordinary moisture content), and portions of such samples were analyzed at selected time intervals to determine how much available chlorine had been evolved, i.e. on the assumption that loss of chlorine represented available chlorine evolved. The results were:

| Sample | Days | Percent Original av. Cl$_2$ evolved |
|---|---|---|
| I | 1 | 14.3 |
|   | 2 | 29.7 |
|   | 6 | 66.8 |
|   | 15 | 85.0 |
| II | 1 | 11.2 |
|   | 2 | 17.4 |
|   | 15 | 55.2 |

Example 16

The same compositions I and II as in Example 15 were prepared. Weighed portions of these compositions were placed in vented glass cups. The cups were placed in individual cardboard cartons each containing 12 non-inoculated lemons. The cartons were sealed with tape.

After one day, the gas inside one of the sealed cartons was sampled by insertion of a hypodermic needle through the cardboard and withdrawal of a measured volume of gas. The gas was analyzed by passing it through acidified potassium iodide solution and determining the liberated iodine by titration with standard thiosulfate. The box was resealed after sampling.

At the end of 8 days, all boxes were opened and the solid compositions remaining were each analyzed for residual available chlorine to determine how much available chlorine had been evolved.

| Citrus Carton Number | Composition Number | Gms. of Composition per Carton | Mgs. NCl$_3$ per cu. ft. gas after 1 day | Percent Original av. Cl$_2$ evolved after 8 days |
|---|---|---|---|---|
| 1 | I | 0.6 | | 100 |
| 2 | I | 3.0 | 12 | 100 |
| 3 | II | 0.465 | | 100 |
| 4 | II | 2.325 | | 97.5 |

Example 17

Composition: Percent
- Pentachloromelamine _____ 83.3
- Sulfamic acid _____ 16.7

1.8 grams of the above composition was placed in a glass cup in a cardboard carton containing 12 non-inoculated lemons. The carton was sealed with tape and stored at room temperature.

After 4 days, the carton was opened and the composition analyzed. It was found that 75% of the original available chlorine content remained, indicating 25% had evolved.

Throughout all the above examples, various acid reagents are shown, and likewise the use of various diluents such as sodium sulfate and diatomaceous earth, and also aluminum sulfate serving as both acid and diluent. Examples 5 to 7 inclusive, 13, and 15 to 17 inclusive, illustrate compositions without a chloride ingredient.

As will now be apparent, the products and procedures afford a convenient and expeditious mode of delivering a sterilizing substance or effect over extended periods of time in small closed spaces, with significantly satisfactory results in inhibiting mold or decay in citrus fruit and the like. The invention thus represents a simple and reliable way of protecting natural produce, such as citrus fruit, tomatoes, cantaloupes and other grown products, while they are under shipment or storage in confined regions, particularly in cartons or other shipping containers.

It is to be understood that the invention is not limited to the specific compositions and operations hereinabove described, but may be carried out in other ways without departure from its spirit.

We claim:

1. A product to be disposed in an enclosed space for generating therein a chlorinous gas selected from the group consisting of chlorine, nitrogen trichloride, monochloramine and dichloramine over an extended period consisting essentially of a dry solid N-chloro compound, dry, solid material for reaction therewith in the presence of moisture released in the enclosed space, to produce the chlorinous gas, said material comprising a substance selected from the class of acidic and alkaline reagents, and moisture permeable envelope means for retaining said compound and material in close mutual association and in position for access of moisture to effectuate said reaction when the product is disposed in the enclosed space.

2. A product as defined in claim 1 wherein the selected substance is an acidic reagent and wherein said material includes a source of chloride ions and a source of ammonia, said N-chloro compound and said material reacting, in the presence of said moisture, to yield a chlorinous gas comprising nitrogen trichloride.

3. A product as defined in claim 1, in which said N-chloro compound is trichloromelamine.

4. A product as defined in claim 1, in which said N-chloro compound is a chloroisocyanuric acid.

5. A product as defined in claim 1, in which said N-chloro compound is trichloroisocyanuric acid.

6. A product as defined in claim 1, in which said N-chloro compound is dichloro dimethyl hydantoin.

7. A nitrogen trichloride generator consisting essentially of a moisture permeable envelope containing a dry, finely divided solid mixture which comprises an active chlorine compound and material for reaction therewith in the presence of moisture to generate nitrogen trichloride, said material comprising an acidic reagent and said material including a source of chloride ions and a source of ammonia.

8. A process for treating natural grown products packed in a container, to inhibit decay, comprising generating chlorinous gas selected from the group consisting of chlorine, nitrogen trichloride, monochloramine and dichloramine within said container over an extended period, by disposing and maintaining in said container an envelope permeable to atmospheric moisture and containing a composition for release of chlorinous gas upon access of moisture thereto, said composition comprising in intermixed relation a dry, solid, stable, active chlorine compound and dry, solid material for reaction therewith in the presence of said moisture to produce said chlorinous gas, said material comprising a substance selected from the class of acidic and alkaline reagents, and said material including a source of chloride ions and a source of ammonia.

9. A process as defined in claim 8, wherein the active chlorine compound is a chloromelamine.

10. A process as defined in claim 8, wherein the active chlorine compound is a chloroisocyanuric acid.

11. A process as defined in claim 8, wherein the active chlorine compound is dichloro dimethyl hydantoin.

12. A process as defined in claim 8, wherein the active chlorine compound is dichloramine T.

13. A process as defined in claim 8, wherein said selected substance is an acidic reagent and wherein the active chlorine compound is a hypochlorite.

References Cited by the Examiner
UNITED STATES PATENTS

| 1,397,504 | 11/21 | Diner | 21—58 |
| 1,686,592 | 10/28 | Wood | 167—84 X |
| 2,032,173 | 2/63 | Johnson et al. | 167—18 |
| 2,075,845 | 4/37 | Gross et al. | 99—225 |
| 2,087,368 | 7/37 | Wilson et al. | 21—108 |
| 2,112,624 | 3/38 | Houghton | 21—108 |
| 2,320,280 | 5/43 | Kalusdian | 167—18 |
| 2,511,987 | 6/50 | Mrak et al. | 99—171 |
| 2,539,470 | 1/51 | Pryor | 99—154 |
| 2,815,311 | 12/57 | Ellis | 167—18 |
| 2,883,322 | 4/51 | Whipple | 167—39 |
| 2,929,761 | 3/60 | Stevens | 167—39 |
| 3,044,885 | 7/62 | Loeher | 99—154 |
| 3,061,549 | 10/62 | Dickey | 206—84 X |

OTHER REFERENCES

G. F. Reddish: Antiseptics Disinfectants and Sterilization, 2nd ed., 1957, p. 687, Lea and Febiger, Philadelphia, Pa.

Chem. Abstracts, vol. 48, p. 5705h.
Chem. Abstracts, vol. 36, p. 42974.
Chem. Abstracts, vol. 33, p. 88419.
Merck Index, 6th ed., 1952, Merck and Co., Inc. Rahway, N.J.; p. 680.

DONALL H. SYLVESTER, *Primary Examiner.*

ABRAHAM H. WINKELSTEIN, MORRIS O. WOLK, *Examiners.*